United States Patent [19]
Kuhn et al.

[11] Patent Number: 6,098,518
[45] Date of Patent: Aug. 8, 2000

[54] PISTON WITH PISTON ROD

[75] Inventors: Peter Kuhn, Weinheim, Switzerland; Frank Obrist, Dornbirn, Austria

[73] Assignees: Audi Aktiengesellschaft, Ingolstad; Bayerische Motoren Werke Aktiengesellschaft, Munich; Daimler-Benz Aktiengesellschaft, Stuttgart, all of Germany

[21] Appl. No.: 08/610,250

[22] Filed: Mar. 4, 1996

[30] Foreign Application Priority Data

Mar. 10, 1995 [CH] Switzerland ................ 693/95

[51] Int. Cl.[7] .................. F01B 3/00; F16J 1/14
[52] U.S. Cl. .......................... 92/71; 92/187
[58] Field of Search ............. 92/71, 187; 417/222.2

[56] References Cited

U.S. PATENT DOCUMENTS

| | | | |
|---|---|---|---|
| 4,480,964 | 11/1984 | Skinner | 417/222.2 |
| 4,836,090 | 6/1989 | Smith | 417/222.2 |
| 5,205,718 | 5/1998 | Kahn et al. | |

FOREIGN PATENT DOCUMENTS

| | | | |
|---|---|---|---|
| 2438444 | 2/1975 | Germany | 92/187 |
| 4024319 | 2/1991 | Germany | |

*Primary Examiner*—F. Daniel Lopez
*Attorney, Agent, or Firm*—Ladas & Parry

[57] ABSTRACT

The piston (1) has a ball receptacle (14) for the rod head (4) of the piston rod (2) of a swash plate compressor. For absorbing particularly high pressures the rod head (4) has a relatively large diameter, so that the ball receptacle (14) extends close to the circumference of the piston (1). The piston wall (15) laterally surrounding the rod head (4) has a circumferential indentation (21) which, in the inwards direction, forms an uninterrupted undercut enclosing the spherical rod head (4).

6 Claims, 3 Drawing Sheets

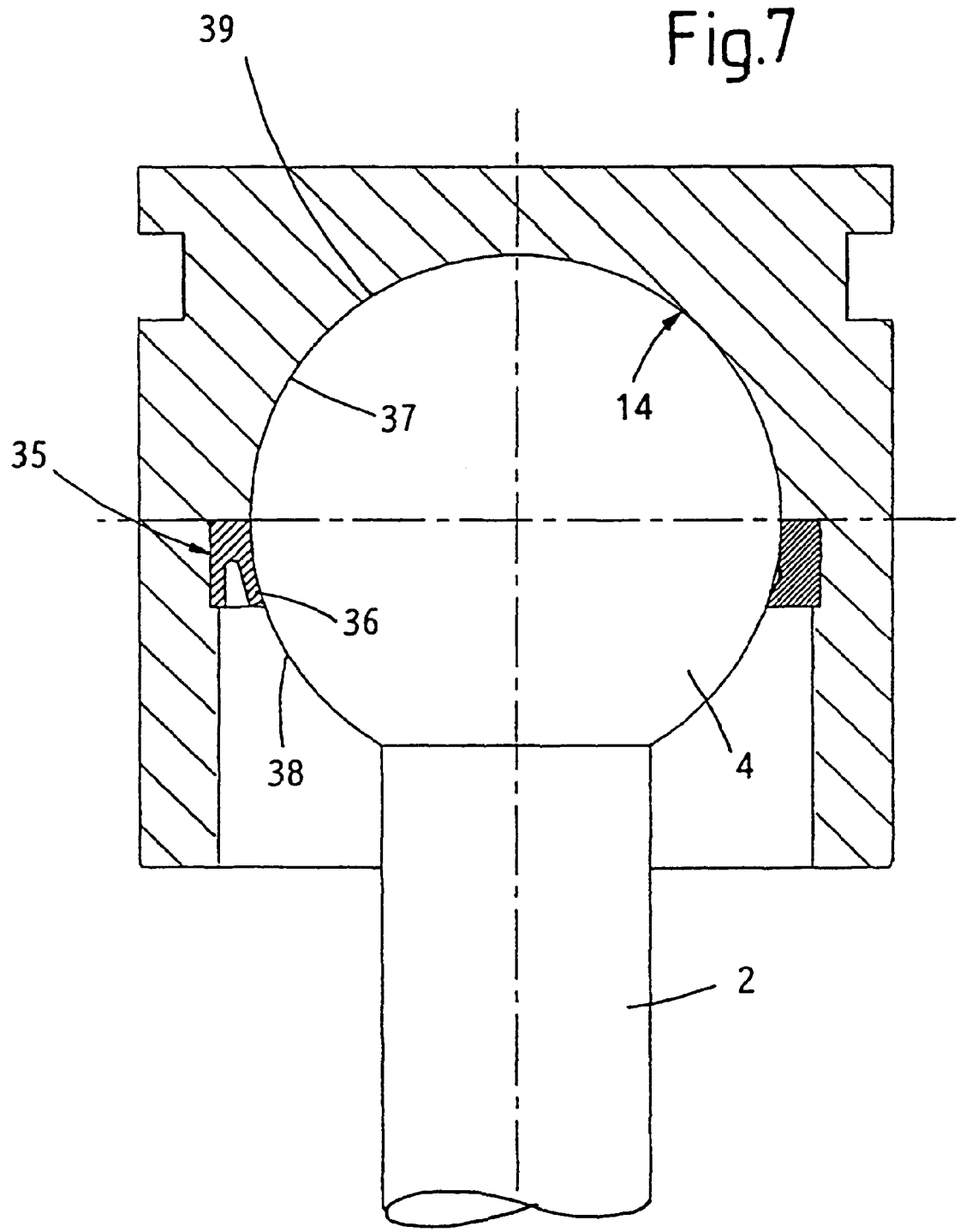

PISTON WITH PISTON ROD

BACKGROUND OF THE INVENTION

The invention relates to a piston with a piston rod for high pressures, particularly a swash plate compressor, which has several circumferentially juxtaposed pistons, which are connected to rods, whose two ends are pivotably mounted by spherical rod heads on the one hand on the piston and on the other on the swash plate in ball receptacles.

DE-A-4024319 discloses a piston of a hydraulic swash plate mechanism, in which a substantially spherical rod head has a bevelled portion, which allows a fitting into a correspondingly shaped ball receptacle, if the rod is in a position outside its normal pivoting range.

The problem of the invention is to find a piston of the aforementioned type, which can absorb particularly high forces and is easy to manufacture.

SUMMARY OF THE INVENTION

According to the invention this problem is solved by a piston of the aforementioned type, wherein the piston is provided between the front and rear piston area with an uninterrupted, circumferential indentation, which inwardly forms an undercut enclosing the spherical rod head.

According to the invention this problem is also solved in that the ball receptacle is hemispherical and in the direction of the rear piston area is bounded by a soft elastic sealing ring sealingly surrounding the spherical piston rod, so that the piston rod is held in the ball receptacle by a reduction of gas pressure in a gap space of the ball receptacle.

In addition, a method and a die for producing the piston provided with an indentation are proposed.

BRIEF DESCRIPTION OF THE DRAWINGS

Advantageous embodiments of the invention form the subject matter of the dependent claims and the following description with respect to the attached drawings, wherein show:

FIG. 7 A cross-section through a piston with a seal on the rod head circumference.

DETAILED DESCRIPTION OF EMBODIMENTS

Figure 1:
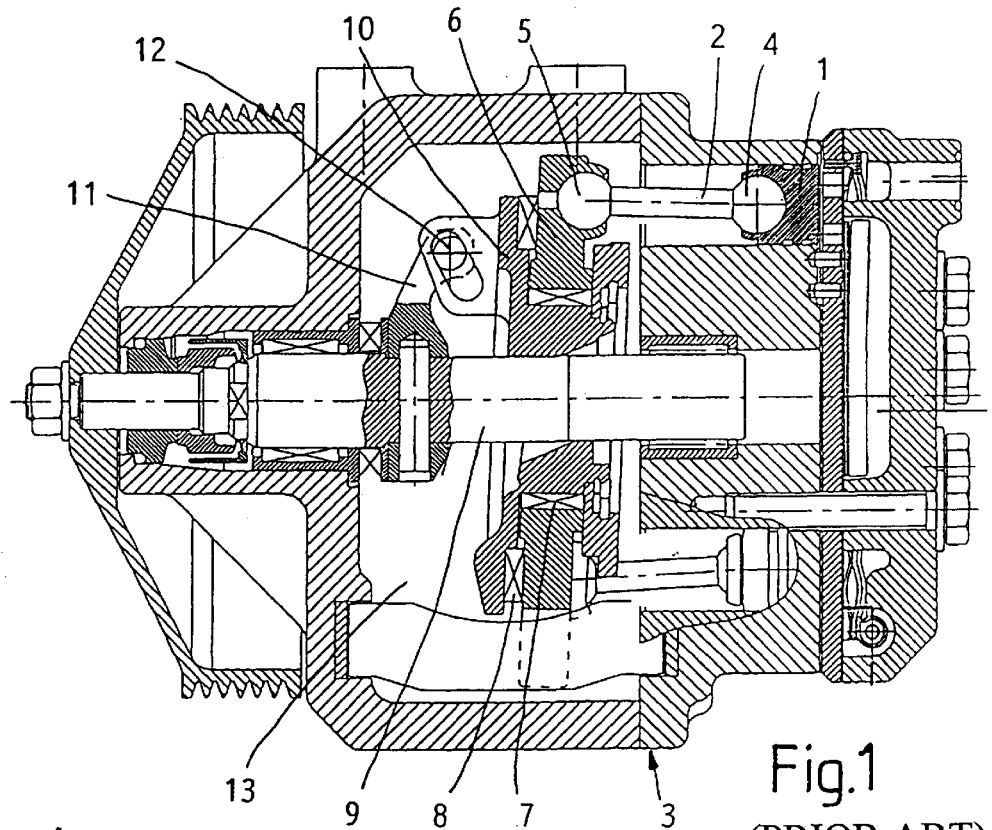
FIG. 1 A cross-section through a swash plate compressor.

Pistons 1 with a ball joint-like connection between the piston rod 2 and the piston 1 are required due to the nature of the rod movement e.g. for swash plate compressors. FIG. 1 shows an embodiment of such an application. The basic structure and fundamental operation are known from the literature, e.g. U.S. Pat. No. 5,205,718.

The pistons 1 of the swash plate compressor 3, whereof e.g. seven are juxtaposed in the circumferential direction of the compressor, are operated by rods 2, whose two ends are pivotably mounted by ball ends 4, 5 on the one hand on the piston 1 and on the other on the swash plate 6 in ball receptacles 14.

The swash plate 6 is held by a radial bearing 7 and an axial bearing 8 on a pivotably mounted plate carrier 10 rotating with the drive shaft 9, so that the rotary movement of the tilting plate carrier 10 brings about a tumbling movement of the swash plate 6 and consequently the pistons 1 connected to the latter perform a lifting movement. The connection between the drive shaft 9 and the plate carrier 10 is provided by a driving joint 12 located at the end of a driving arm 11.

The pivoting movement of the plate carrier 10 and the swash plate 6 mounted thereon about the driving joint 12 results from the difference in the pressures acting on both sides of the piston 1. Corresponding to the inclination of the swash plate, the bottom dead centre of the piston movement is changed, whereas the top dead centre remains unchanged. The higher the pressure on the bottom of the piston or in the driving space 13 relative to the pressure on the top of the piston or on the suction side of the compressor 3, the smaller the lift of the piston 1 and therefor the delivery of the compressor 3. Since, for modifying the inclination of the swash plate, compressed gas is passed into the driving space, as a function of the application, high pressures can occur there.

For compressing to high pressures, which can e.g. be 120 bar for a supercritically operating $CO_2$ vapour compression refrigeration process, the piston shape and the size of the spherical rod ends 4, 5 must be so adapted due to the high forces acting on the piston 1 that the size of the diameter of the rod head 4 significantly approaches, e.g. to more than 70% the diameter of the piston 1. The invention inter alia deals with the fact that the piston 1 or the connection between the latter and the piston rod 2, in the case of low manufacturing costs, can so adapt to extreme conditions of this type that it is particularly reliable and stable even in the case of low surface pressures on the ball receptacles 14.

Figure 2:
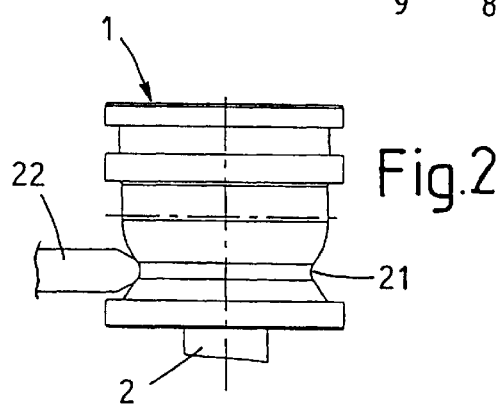
FIG. 2 A side view of a piston according to the invention.
Figure 3:
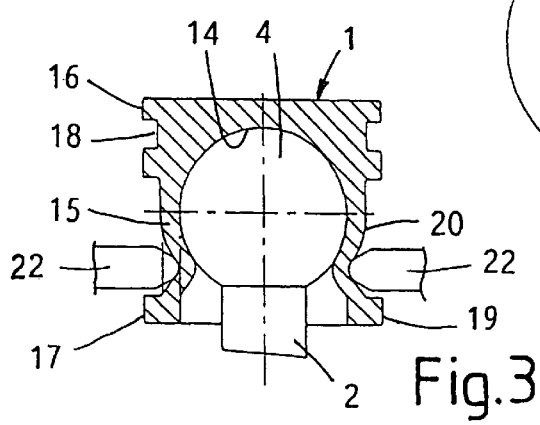
FIG. 3 A cross-section through the piston of FIG. 2.

In the embodiment of a piston according to the invention shown in FIGS. 2 and 3, the rod head 4 has a diameter of approximately 70% of the largest piston diameter. However, compared with the piston diameter in the vicinity of the location of the rod head 4, where the piston 1 is inwardly offset, the rod head diameter is more than 80%, so that the remaining thickness of the lateral piston wall 15 enclosing the rod head 4 is reduced to a minimum with respect to the strength requirements.

In its front area 16 and its rear area, the piston 1 has a larger diameter in order on the one hand to provide a groove 18 for receiving a not shown piston ring and on the other a guide surface on the rear piston end.

In the inwardly offset, central area 20 of the piston 1, as a result of a material deformation starting from a cylindrical wall, there is a circumferential indentation 21, so that it so engages below the spherical rod head 4 that it is positively securely held in the ball receptacle 14 of the piston 1.

Figure 4:
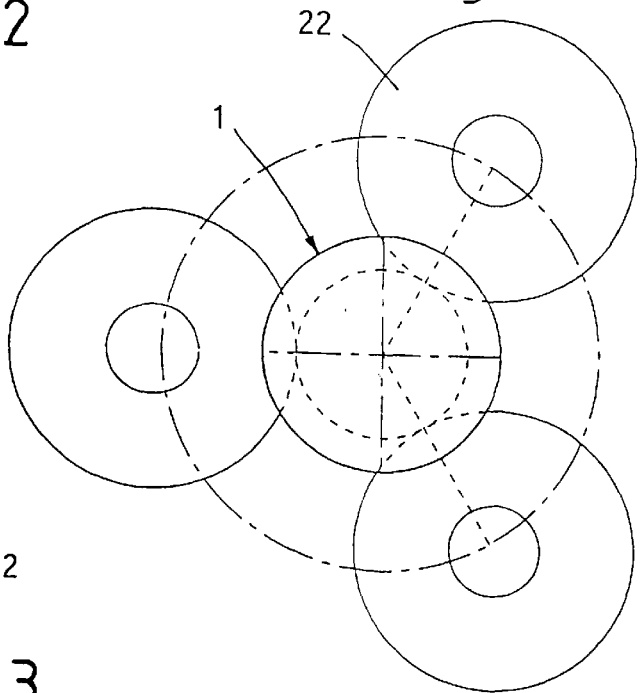
FIG. 4 A plan view of the piston of FIG. 2 with three curling tools in deformation engagement.

FIG. 4 diagrammatically shows an example for the arrangement of rotatably mounted, disk-like deforming tools 22 on the circumference of the piston 1 during the manufacture of the circumferential indentation 21, which is intended to provide the permanent connection between the piston 1 and the piston rod 2. On their circumference the deforming tools 2 are rounded, so that during the rotation thereof relative to the piston 1 and radial pressure against the piston wall 15, production is possible of the cross-sectionally rounded, circumferential indentation 21.

Figure 5:
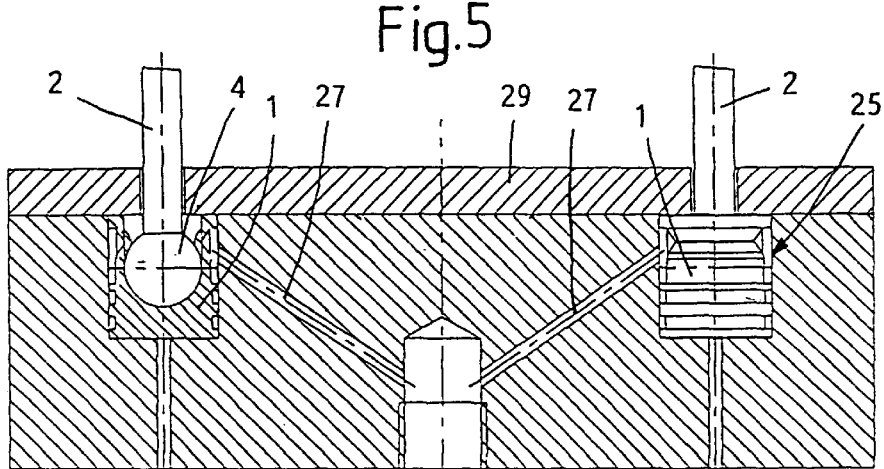
FIG. 5 A cross-section through a die for the hydraulic shaping of a piston according to the invention.
Figure 6:
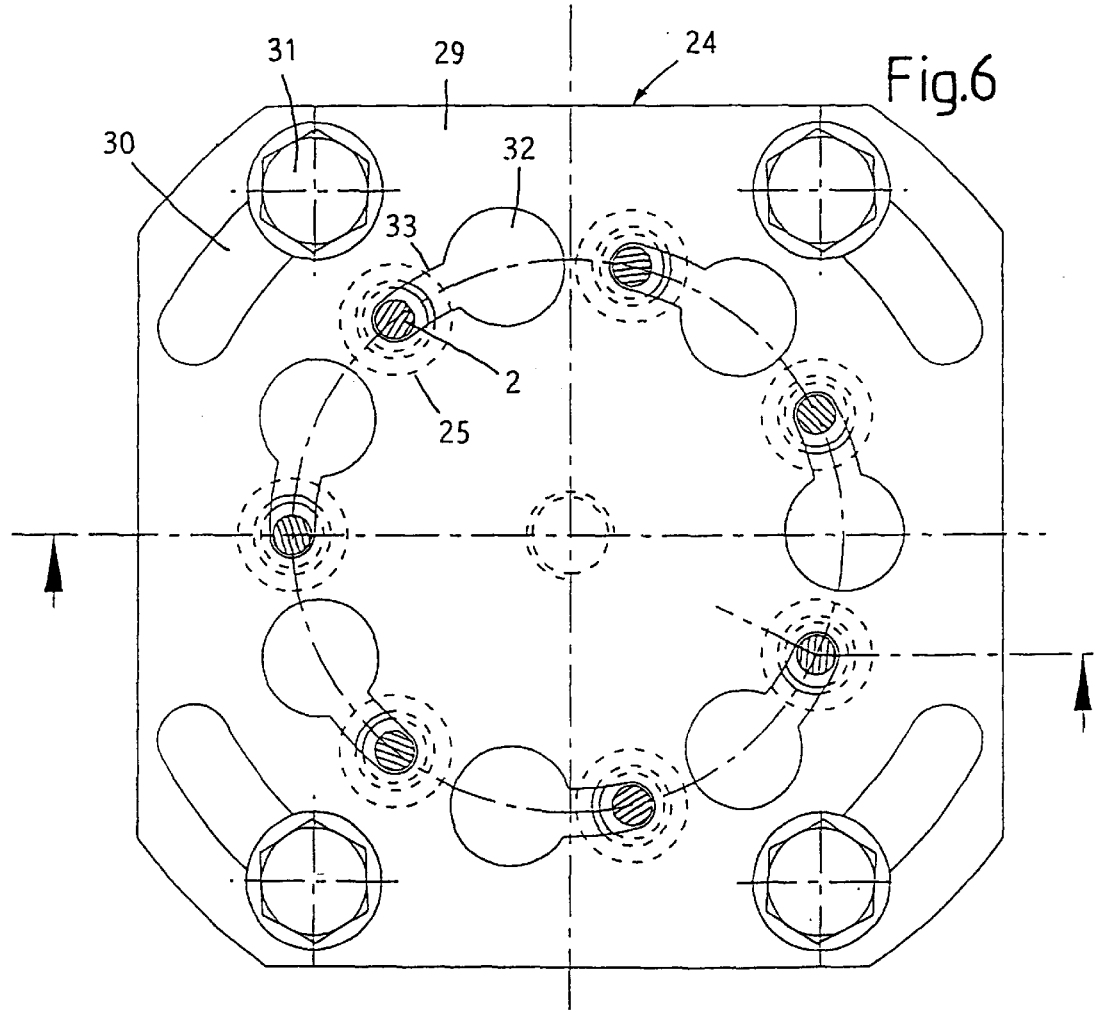
FIG. 6 A plan view of the die of FIG. 5.

Instead of by mechanical material deformation by means of the curling tools 22, there can be a deformation of the piston wall 15 closely adapted to the shape of the spherical rod head by the pressure of a hydraulic medium. FIGS. 5 and 6 show a suitable forming die 24. In said die are provided several cylindrical reception spaces 25 for in each case one piston 1 in which, starting from a central channel 26, several branch lines 27 issue into an area on which is located the wall area 15 of the piston 1. The e.g. seven reception spaces 25 and their arrangement in the die 24 correspond to those of the cylinder spaces of a swash plate compressor 3, so that the die 24 is simultaneously an assembly tool.

The cylindrical inner wall of the reception spaces 25, at least on the marginal area thereof, is adapted with small tolerance to the external diameter of the piston 1 in its rear area, so that a correspondingly small sealing gap there permits an adequate hydraulic pressure to curve outwards the previously cylindrical piston wall 15, so that the spherical rod head 4 is positively enclosed in the piston 1. An adjustment of the hydraulic pressure ensures that the rod head 4 is not jammed in the cavity of the piston 1. For securing the piston-rod units 1, 2 during the hydraulic deformation in the die 24, the latter is covered by a cover plate 29. The latter can be turned backwards and forwards between two positions by guidance on four arcuate elongated holes 30 and threaded bolts 31 located therein, so that the openings 32 can be positioned above the reception spaces 25 when the piston-rod units 1, 2 are inserted in the die 24 and in order to move them into the closure position shown in FIG. 6, in which only the piston rod 2 can extend outwards through a slot 33 following onto the opening 32.

Instead of having a circumferential indentation 21 of the piston wall 15, the spherical rod head 4 can also be held by a sealing ring 35 inserted inwards on said piston wall .15. As a result of a U-shaped cross-section of this sealing ring 35, it has a soft elastic sealing lip 36 engaging on the rod head 4 and directed towards the piston rod 2 and is located adjacent to the hemispherical inner face 37 of the ball receptacle 14. The sealing lip 36 engages on the area 38 of the rod head 4 tapering from the largest ball diameter towards the piston rod 2. The sealing ring 35 is also so shaped that the inner face 37 of the ball receptacle 14 is substantially continuously adjacent to the sealing ring 35. This avoids a clearance, so that the gap space 39 of the ball receptacle 14 bounded by the sealing ring 35 and rod head 4 can not communicate with the driving space 13. A reduction in gas pressure in the gap space 39, as the rod head 4 moves away from the ball receptacle, tends to hold the rod head 4 in the ball receptacle.

We claim:

1. A swash plate compressor, which has several circumferentially juxtaposed pistons, which are connected to piston rods, whose two ends are pivotably mounted by spherical rod heads on the one hand on the piston and on the other on the swash plate in ball receptacles, wherein the ball receptacle of the piston is hemispherical and is bounded by a soft elastic sealing ring sealingly surrounding the spherical piston rod, so that the piston rod is held in the ball receptacle by a reduction of gas pressure in a gap space of the ball receptacle.

2. A swash plate compressor according to claim 1, wherein the sealing ring has a sealing lip engaging on the rod head and directed towards the piston rod.

3. A swash plate compressor according to claim 2, wherein the sealing lip engages behind the spherical rod head.

4. In combination, a piston with a piston rod, the piston rod having at least one spherical rod head disposed on at least one end of the piston rod, the at least one spherical rod head mating with a ball receptacle, wherein the ball receptacle of the piston is hemispherical and is bounded by a soft elastic sealing ring sealingly surrounding the spherical rod head, so that the piston rod is held in the ball receptacle by a reduction of gas pressure in a gap space of the ball receptacle.

5. The combination according to claim 4, wherein the sealing ring has a sealing lip engaging on the spherical rod head and directed towards the piston rod.

6. The combination according to claim 5, wherein the sealing lip engages behind the spherical rod head.

* * * * *